Dec. 15, 1936.  A. R. THOMAS  2,064,233
REFRIGERATION
Filed June 1, 1933  4 Sheets-Sheet 2

INVENTOR.
A. R. Thomas
BY
H. Yates Dowell
ATTORNEY.

Patented Dec. 15, 1936

2,064,233

UNITED STATES PATENT OFFICE 2,064,233

REFRIGERATION

Albert R. Thomas, New York, N. Y., assignor, by mesne assignments, to Servel, Inc., Dover, Del., a corporation of Delaware Application June 1, 1933, Serial No. 673,815

26 Claims. (Cl. 62—119.5)

This invention relates generally to refrigeration and more particularly to an absorption refrigeration system of the pressure equalized continuous type.

The temperature of air in a refrigerator storage compartment is maintained at a suitable value for the proper preservation of comestibles or other substances to be contained therein by transfer of heat to a cooling element such as the evaporator of a refrigeration apparatus. The air temperature usually considered proper for foodstuffs is below 50° F. but higher than the freezing temperature of water. In household refrigerators, it is convenient to also utilize the cooling element for freezing water into ice, making frozen food products, and the like, which requires a temperature below the freezing point of water.

To maintain proper air temperature in the refrigerator there is provided a control device, which may be a thermostat, operative responsive to either temperature of the air or temperature of the cooling element to control operation of the refrigeration apparatus to maintain the temperature of the air or cooling element substantially constant or between predetermined limits. When control is responsive to temperature of the cooling element, certain allowance is made for a temperature differential between the cooling element and the air. However, as the temperature at the outside of the refrigerator storage compartment changes, the rate of heat leakage into the compartment changes, wherefore the temperature differential between the cooling element and the air in the compartment also changes. It thus occurs with control responsive to cooling element temperature that the storage compartment becomes too cold at low outside temperature and too warm when the outside temperature is high. On the other hand, if control is responsive to the air temperature, the variation of heat leakage with variation of outside temperature effects an equally unsatisfactory variation in cooling element temperature available for freezing of ice cubes or the like.

In accordance with this invention, both air in the storage compartment of a refrigerator and the ice freezing chamber are maintained substantially constant at their respective correct temperatures throughout a wide variation in room temperature.

The invention is appropriately embodied in an arrangement whereby there is provided in a refrigerator storage compartment a cooling element or section adapted to maintain a predetermined substantially constant temperature and having just sufficient heat transfer surface presented to the air in the storage compartment to maintain the temperature of the latter at the proper value when the room temperature, and therefore heat leakage, is low and, in addition one or more air cooling elements or sections automatically brought into operation successively upon rise of room temperature and increase of heat leakage. Preferably, the first cooling element or section is operated at a constant temperature below the freezing temperature of water (as by a thermostat attached thereto controlling supply of energy to the refrigerating system) and is constructed to form a freezing chamber for the reception of ice trays and the like. This section is arranged to have only limited heat transfer relation with the air in the storage compartment, but the additional section or sections may be arranged for extensive heat transfer with the air by providing heat transfer fins, and operated at temperatures above the freezing temperature of water. The high temperature section or sections are preferably located in the top of the refrigerator compartment for the most advantageous cooling with natural air circulation since the warmest air is in the top of the compartment.

More specifically the invention is conveniently embodied in an absorption refrigeration system of the pressure equalized, continuous type. The principles of operation of this type of system are well known in the art and completely set forth in Patent No. 1,609,334 to B. C. von Platen et al. In such a system, the inert gas, usually hydrogen, is charged at a pressure corresponding to the maximum condensing pressure required, which depends on the maximum temperature of the cooling medium. When air is used as the cooling medium, it will be appreciated that upon decrease of room temperature, the required heat radiating surface of the condenser becomes less, since the condensing pressure and temperature do not decrease in relation to the room air temperature.

In accordance with the invention, a lower cooling element or section, forming a freezing chamber and having limited heat transfer surface presented to air in the refrigerator storage compartment, is supplied with condensed refrigerant from the first part of the condenser, and upper sections, having extensive air cooling surfaces, are connected to be supplied with condensed refrigerant from subsequent portions of the condenser. Thus, when the room temperature is low, the refrigerant is all condensed in the first part of the condenser and delivered to the lower evaporator section, the limited surface of which is then sufficient to maintain the storage compartment at the proper temperature, since the heat leakage is small. Upon rise of room temperature, condensation occurs in the subsequent condenser section and liquid refrigerant is delivered to an upper evaporator section which then functions to cool the air, which additional cooling is necessary since the heat leakage into the box has increased. The higher temperature of the upper evaporator section results from proper circulation of the inert gas such that the vapor pressure of refrigerant in the upper section is greater than in the lower or freezing section.

The invention will be more fully understood by reference to the following description taken in connection with the accompanying drawings, in which, Fig. 1 shows diagrammatically an absorption refrigeration system embodying a preferred arrangement in accordance with the invention;

Figure 1:
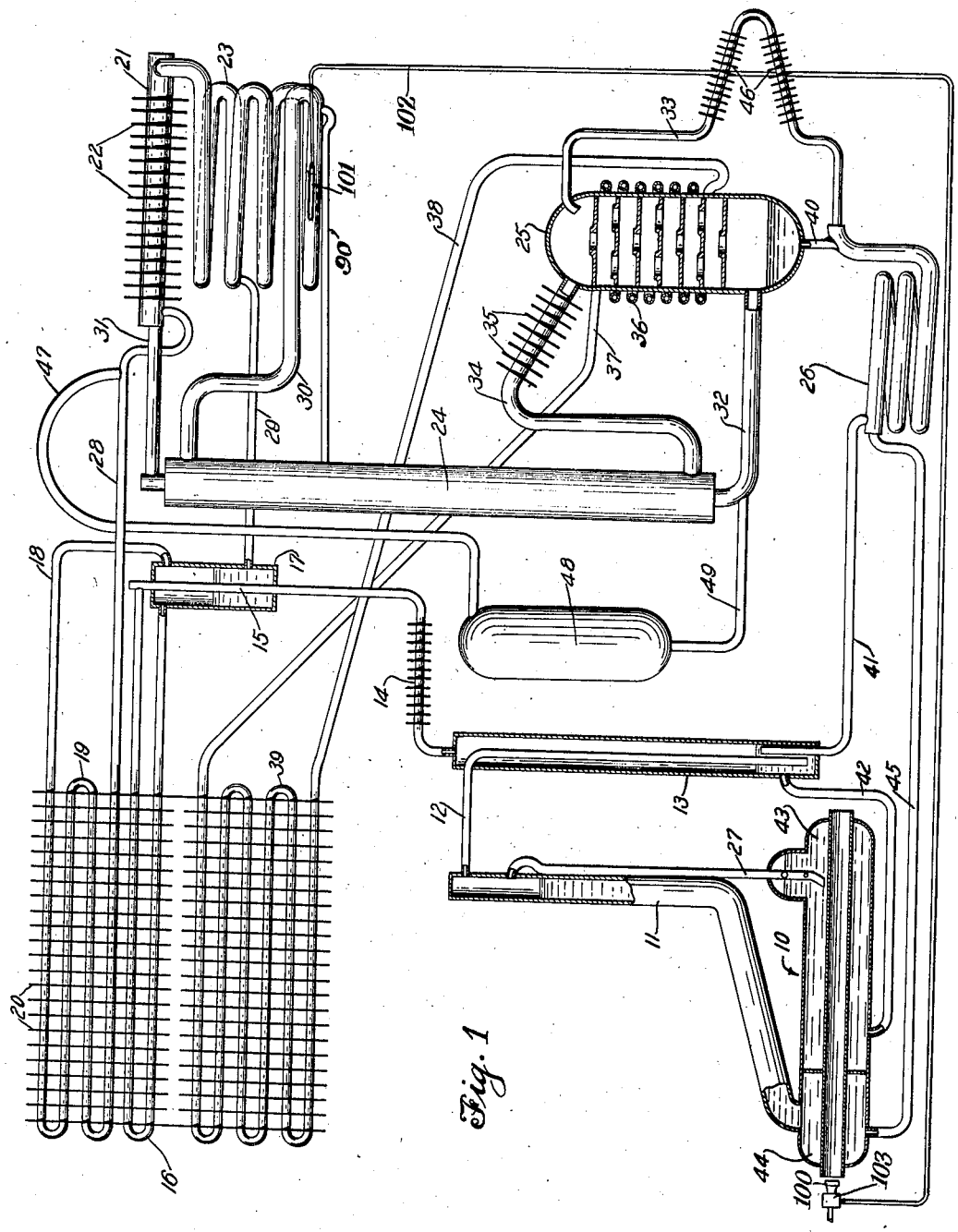

Referring to Fig. 1 of the drawings, refrigerant vapor such as ammonia expelled by heat in the generator 10 from solution with an absorbent such as water flows from the upper end of the generator standpipe 11 through conduit 12, analyzer 13, air cooled rectifier 14, and ammonia cooled rectifier 15 to a first condenser section comprising a pipe loop 16. From the latter, liquid ammonia drains into the jacket 17 of the low temperature or ammonia cooled rectifier 15 and uncondensed vapor flows from the upper part of the rectifier jacket 17 through conduit 18 to a second condenser section comprising a pipe coil 19. Both the condenser sections 16 and 19 are provided with heat radiating fins 20 for air cooling.

The cooling element comprises an upper evaporator section 21, provided with an extensive heat transfer surface formed by fins 22, and a lower evaporator section 23, comprising a pipe coil. The sections 21 and 23 are connected in series, providing a continuously downward path of flow for liquid therethrough and circulation of an inert pressure equalizing gas such as hydrogen, as hereinafter set forth. For a more detailed description of this type of cooling element, reference may be had to my application Serial No. 645,432 filed December 2, 1932. A drain pipe 90 is provided between the bottom of the lower evaporator section 23 and the gas heat exchanger 24.

The cooling element is interconnected through a gas heat exchanger 24 with an absorber 25 for the circulation of hydrogen therebetween and the absorber 25 is interconnected through a liquid heat exchanger 26 with the generator 10 for circulation of absorption solution therebetween by a thermosyphon 27, as well known in the art.

In accordance with this invention, the second condenser section 19 drains through conduit 28 into the upper end of the high temperature evaporator section 21 and liquid ammonia in the rectifier jacket 17 overflows through conduit 29 into the low temperature evaporator section 23. In the evaporator sections 21 and 23, the liquid ammonia flows downwardly, evaporating by diffusion into hydrogen which enters the evaporator through conduit 30. The resulting gas mixture flows from the upper end of the evaporator through conduit 31, gas heat exchanger 24, and conduit 32 into the lower part of the absorber 25 where it flows upwardly in contact with weak absorption solution which enters the absorber through conduit 33. The ammonia is absorbed out of the gas mixture and the weak gas returns to the evaporator through conduit 34, gas heat exchanger 24, and conduit 30, thus completing the gas cycle. The conduit 34 is provided with heat radiating fins 35 for cooling the weak gas before passage through the gas heat exchanger 24 back to the evaporator, thus aiding in decreasing the amount of heat carried by the gas into the evaporator.

The absorber 25 is provided with a cooling coil 36 which is connected through conduits 37 and 38 with an air cooled condenser 39 forming a secondary cooling system which is charged with a suitable cooling fluid such as methyl chloride. In the cooling coil 36 heat is transferred from the absorber to vaporize the methyl chloride which rises through conduit 37 to the condenser 39 where condensation takes place, the resulting liquid draining back to the cooling coil through conduit 38.

Enriched absorption solution accumulates in the lower part of the absorber 25 from where it flows through conduit 40, liquid heat exchanger 26, and conduit 41 into the analyzer 13 where the ammonia gas flowing from the generator in conduit 12 is bubbled through the solution before passing to the condenser. From the analyzer 13, the rich solution flows through conduit 42 into chamber 43 of the generator 10 from where it is raised through a thermosyphon 27 into the standpipe 11, in a manner well known in the art. The standpipe communicates at its lower end with a second generator chamber 44 from which weak absorption solution flows through conduit 45, liquid heat exchanger 26, and conduit 33 to the absorber. The conduit 33 is provided with heat radiating fins 46 which aid in reducing the temperature of the weak solution before entrance into the absorber to increase the amount of ammonia gas absorbed into solution.

The lower end of the second condenser section 19 is vented through conduit 47, a pressure vessel 48, and conduit 49 into the inert gas system. The system, including the pressure vessel 48, is charged with hydrogen at a pressure sufficient for condensation of ammonia in the condenser at a predetermined room temperature. It will be apparent that if the room temperature increases above the predetermined value, uncondensed ammonia vapor will pass through conduit 47 into the pressure vessel 48 and displace hydrogen therefrom into the gas circuit between the absorber and evaporator, thus increasing the total pressure in the system to such a value that condensation again occurs in the condenser.

The generator may be heated, for example, by a gas burner 100. The supply of heat is controlled in response to temperature of the low temperature evaporator section 23 so as to maintain the temperature of this section substantially constant. For this purpose a bulb 101 may be attached to the low temperature evaporator section to which is connected a tube 102, in turn connected to a valve 103, the tube and bulb containing a volatile liquid and operating in well known manner with the aid of other known mechanism to cause increase of supply of gas on increase of bulb temperature and conversely decrease of supply of gas on decrease of bulb temperature.

With the above described system, it will be apparent that at low room temperatures and low heat input all of the ammonia vapor will be condensed in the first condenser section 16 and thus liquid ammonia will only be supplied through conduit 29 to the low temperature section 23 of the evaporator. This evaporator section has but small surface presented to the air in the refrigerator storage compartment to be cooled but is sufficient for maintaining the compartment at the proper temperature since at the low room temperature, heat leakage through the insulated walls of the refrigerator compartment is small. Upon increase of room temperature and input, greater condenser surface is necessary and vapor passes through conduit 18 into the second condenser section 19 from where liquid ammonia drains through conduit 28 into the upper end of the high temperature evaporator section 21. Thus, upon increase in room temperature, the evaporator section 21 with its extensive heat transfer surface is brought into operation to cool the air in the refrigerator compartment and this cooling is now necessary to maintain the proper temperature since heat leakage through the insulated walls of the refrigerator compartment increases with the increase in room temperature.

It will be noted that in the system described above only the second condenser section 19 need be located above the level of the evaporator and the first section 16 may be located below the top of the evaporator, thus allowing an appreciable decrease in condenser space above the unit, which is of considerable importance when such a system is to be used in household refrigerators, as hereinafter set forth.

Figure 2:
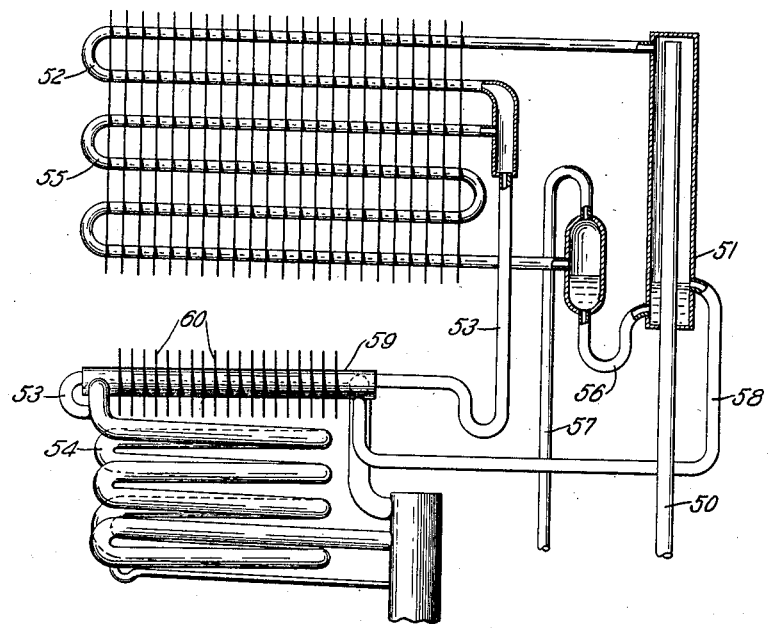
Fig. 2 shows diagrammatically a modification of the invention which may be used in the system shown in Fig. 1.

In Fig. 2 is shown a modification in which the condenser is located entirely above the evaporator. Refrigerant vapor flowing from the generator through conduit 50 passes through a rectifier vessel 51 into a first condenser section 52. The latter drains through conduit 53 to the upper end of the lower evaporator section 54 and is vented into a second condenser section 55. The latter drains through conduit 56 into the rectifier vessel 51 and is vented through conduit 57 to the gas circuit of the system described in connection with Fig. 1. From the rectifier vessel 51, liquid overflows through conduit 58 into the upper high temperature evaporator section 59 provided with cooling fins 60.

Operation of this embodiment is similar to that described in connection with Fig. 1. At low room temperatures, all of the refrigerant vapor is condensed in the upper section 52 and is supplied through conduit 53 only to the low temperature evaporator section 54. Upon increase of room temperature, refrigerant vapor passes into the lower condenser section 55 and condensed refrigerant liquid is supplied through conduit 56, rectifier vessel 51, and conduit 59 to the high temperature evaporator section 59.

Figure 3:
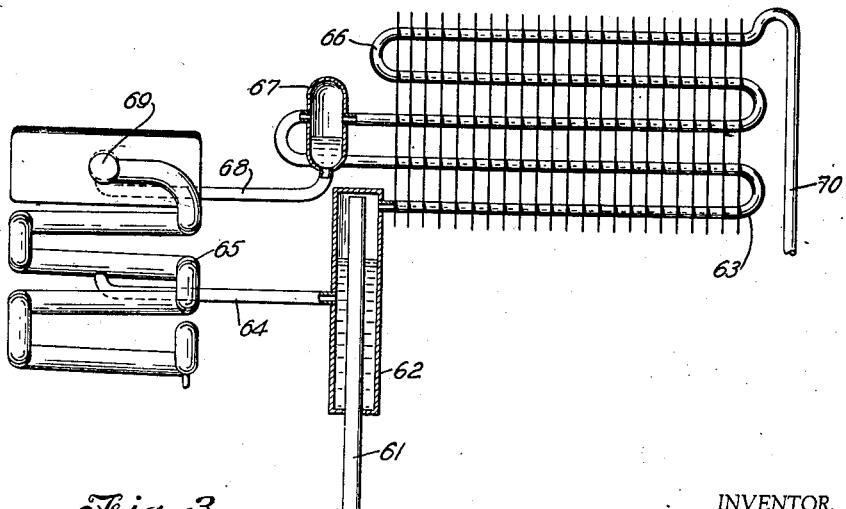
Fig. 3 shows diagrammatically still another modification applicable to the system shown in Fig. 1.

The embodiment illustrated in Fig. 3 is exactly the same as that described in connection with Fig. 1 except that vapor flows through the condenser in the opposite direction to the flow of the draining condensate. Refrigerant vapor from the generator flows in conduit 61 through the rectifier vessel 62 into the lower end of a first condenser section 63. At low room temperatures, all of the vapor is condensed in the section 63 and drains back in opposition to the direction of vapor flow into the rectifier vessel 62 from which it overflows through conduit 64 into the low temperature evaporator section 65. Upon increase in room temperature, vapor passes from the lower condenser section 63 into the lower end of an upper condenser section 66 and condensate drains from the latter section 66, in the opposite direction to the gas flow, into a vessel 67 from which the liquid overflows through conduit 68 into the high temperature evaporator section 69. The upper end of the condenser section 66 is vented through conduit 70 to the gas circuit of the system such as that described in connection with Fig. 1.

Figure 4:
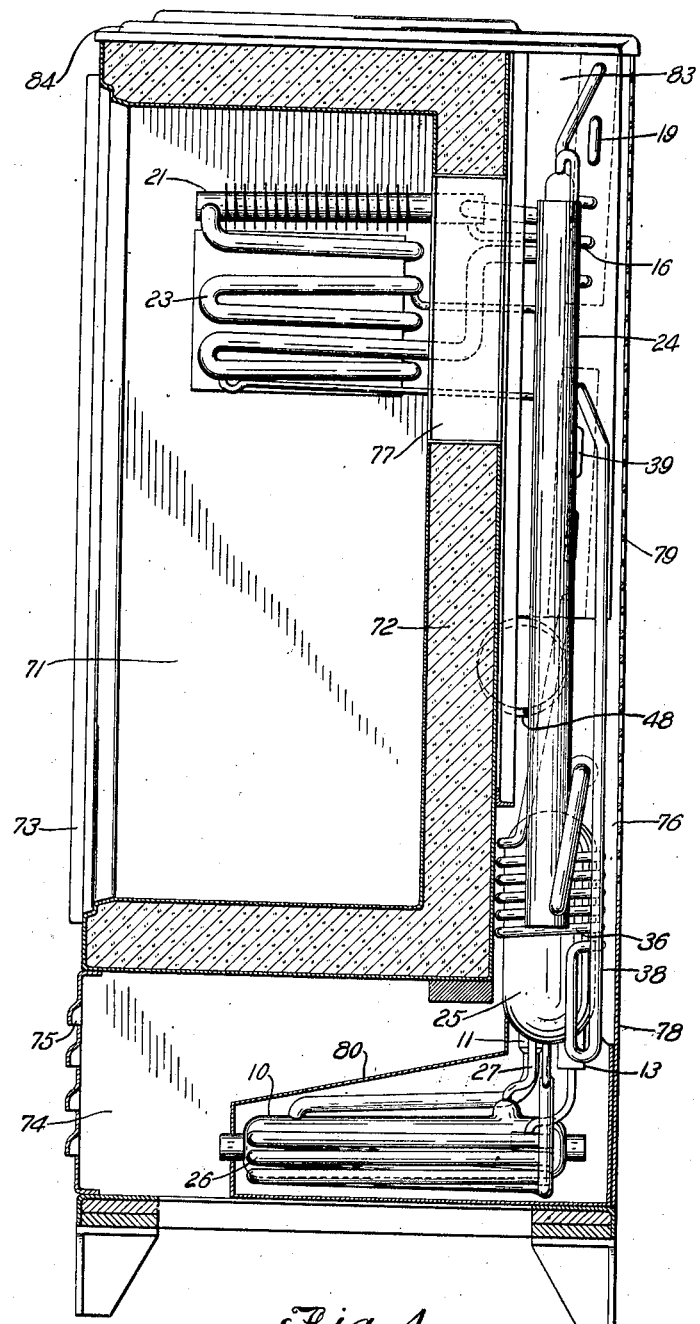
Fig. 4 shows in side elevation, with parts broken away, an absorption refrigeration unit similar to that shown in Fig. 1 mounted in a refrigerator cabinet.
Figure 5:
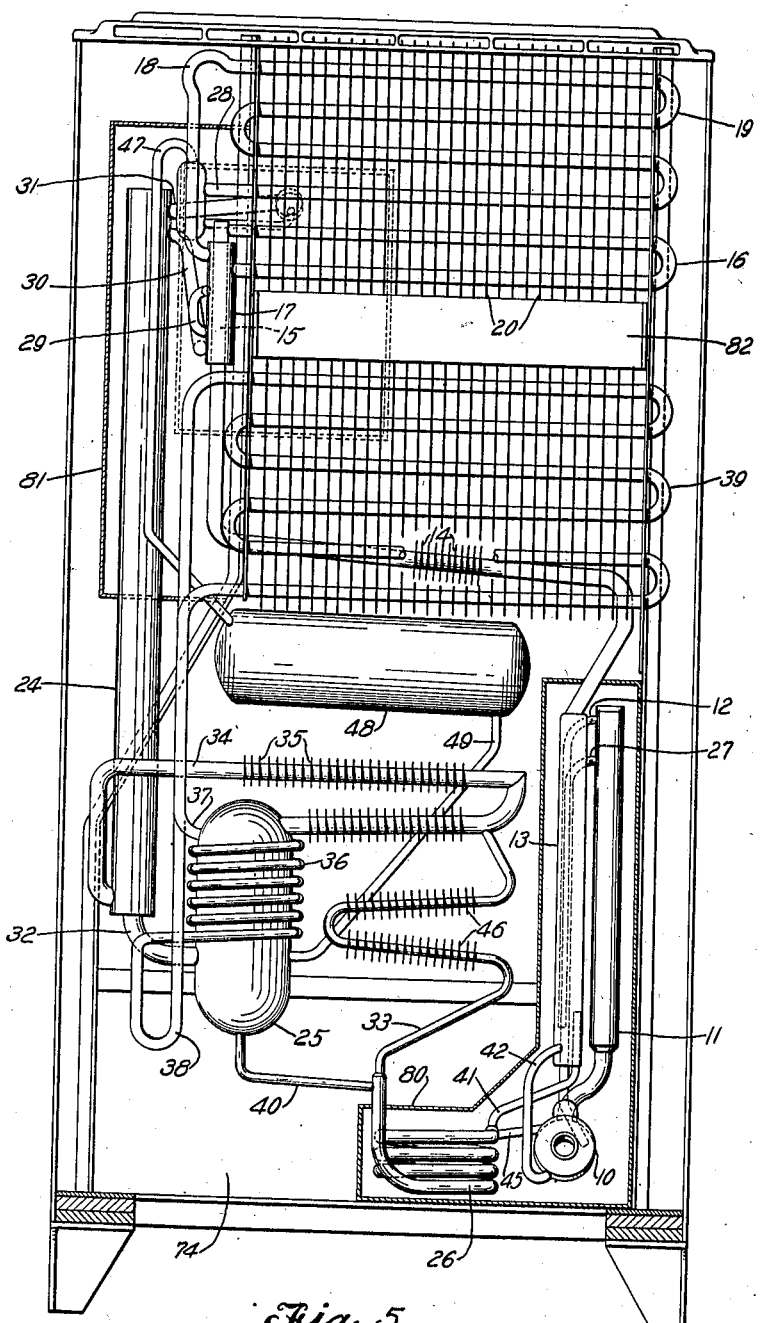
Fig. 5 is a rear view of the refrigerator shown in Fig. 4 with parts broken away.

In Figs. 4 and 5 the apparatus illustrated in Fig. 1 and previously described is shown mounted in a suitable refrigerator cabinet. The same parts in Figs. 1, 4, and 5 are indicated by the same reference numerals. As seen from the side elevation in Fig. 4, with wall parts broken away, the refrigerator cabinet comprises a storage compartment 71 provided with walls of heat insulating material 72 and accessible through a heat insulated door 73. Below the storage compartment is an apparatus compartment 74 provided with louvres 75 for admission of air. From the rear of the apparatus compartment 74 there extends upwardly behind the storage compartment to the top of the cabinet a comparatively narrow space 76.

The rear wall of the storage compartment 71 is provided with an opening into the rear space 76 which is closed by a heat insulating wall section 77 when the apparatus is mounted in position as shown. The horizontal portion of the generator 10 and the liquid heat exchanger 26 are located in the lower apparatus compartment 74 and the other parts of the apparatus are mounted in the rear space 76 with the cooling element comprising sections 21 and 23 within the storage compartment 71, connections to the cooling element extending through the wall section closure member 77. The rear wall 78 of the cabinet is preferably formed with a grille section 79 opposite the air cooled condensers and is removable for ready insertion and withdrawal of the apparatus unit. The generator 10, standpipe 11, analyzer 13, and liquid heat exchanger 26 are surrounded with thermal insulating material, not shown for clarity of illustration, held in place by a casing 80. The upper end of the gas heat exchanger 24, rectifier jacket 17, and the connections thereto are also surrounded with thermal insulating material, not shown, and enclosed by a casing 81 indicated in Fig. 5.

As shown in Fig. 5 the space between the ammonia and methyl chloride condensers is closed by a member 82 so that air passes only over the condenser coils through the heat radiating fins 20 into a flue space 83 formed between the condensers and the rear wall of the storage compartment. The refrigerator top 84 is provided with suitable openings, not shown, above the flue space 83 so as not to obstruct the flow of air which passes through the rear grille 79, over the condenser coils, and up the flue space 83. In order to further aid natural draft cooling of the condensers, the pressure vessel 48 is mounted in a recess in the wall horizontally beneath the lower end of the methyl chloride condenser 39 to obstruct any appreciable flow of cooler air from the space 76 into the flue space 83 behind the condensers which would decrease the draft.

It will be apparent that if the condenser section 16 could not be located below the top of the evaporator 21 it would make necessary lowering the evaporator, extending the condenser above the top of the refrigerator, or increasing the depth of the space 76 in the rear of the refrigerator in order to obtain sufficient condenser cooling surface.

It will be obvious to those skilled in the art that various other changes may be made in the construction and arrangement without departing from the spirit of the invention and therefore the invention is not limited to what is shown in the drawings and described in the specification but only as indicated in the following claims.

I claim:

1. In a refrigerator having a storage compartment, a cooling element in said compartment comprising an upper evaporator having an extensive heat transfer surface and a lower evaporator having a limited heat transfer surface, means for supplying liquid refrigerant to said lower evaporator, and means for supplying liquid refrigerant to said upper evaporator responsive to the temperature at the outside of said compartment.

2. In a refrigerator having a storage compartment, a cooling element in said compartment comprising an upper section having an extensive heat transfer surface and a lower section having a limited heat transfer surface, said sections being connected in series to form a continuously downward path of flow for liquid therethrough, connections for circulation of inert gas through said cooling element, means for supplying liquid refrigerant to said lower section, and means for supplying liquid refrigerant to said upper section responsive to the temperature at the outside of said compartment.

3. In a refrigerator, a cooling element comprising a first evaporator having an extensive heat transfer surface and a second evaporator having a limited heat transfer surface connected to receive unevaporated liquid from said first evaporator, a refrigeration apparatus having an air cooled condenser connected to supply liquid refrigerant to said first evaporator, and a liquid by-pass connection from the first part of said condenser to said second evaporator.

4. In a refrigerator, an evaporator comprising a first section having an extensive heat transfer surface and a second section having a limited heat transfer surface, refrigeration apparatus including an air cooled condenser having a first portion connected to deliver liquid refrigerant only to said second evaporator section and a succeeding portion connected to deliver liquid refrigerant to both of said evaporator sections.

5. A refrigerator comprising, a cabinet having a thermal insulated compartment and an absorption refrigeration apparatus of the pressure equalized type including, an evaporator in said compartment having an upper section with extensive heat transfer surface and a lower section with limited heat transfer surface, said sections being connected to form a continuously downward path of flow for liquid therethrough and circulation of inert gas, a generator, an air cooled condenser comprising a first pipe coil connected to receive refrigerant vapor from said generator and discharge liquid into said lower evaporator section and a second pipe coil connected to receive vapor from said first coil and discharge liquid into said upper evaporator section.

6. An absorption refrigeration system of the pressure equalized type including, a generator, an air cooled condenser comprising two sections connected in series to receive vapor from said generator, an evaporator comprising an upper section having extensive heat transfer surface and a lower section having a limited heat transfer surface, said evaporator sections forming a continuously downward path of flow for liquid therethrough and adapted for circulation therethrough of an inert gas, a connection for liquid from the first condenser section to said lower evaporator section, and a connection for liquid from the second condenser section to said upper evaporator section.

7. An absorption refrigeration apparatus of the pressure equalized type including, a generator, a condenser comprising two pipe coils connected in series to receive vapor from said generator, an evaporator comprising an upper section provided with heat transfer fins and a lower section comprising a pipe coil, said sections being connected to form a continuously downward path of flow for liquid and circulation of inert gas therethrough, a connection for draining liquid from the first condenser pipe coil to said lower evaporator section, and a connection for liquid from the second condenser pipe coil to said upper evaporator section.

8. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, and means to supply vaporous refrigerant to said first condenser section, said second condenser section being connected to receive vaporous refrigerant when the first condenser section is inadequate to condense refrigerant, said first and second evaporator sections being so connected in the system that liquid refrigerant flowing from the first condenser section is confined to the first evaporator section for evaporation.

9. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the first condenser section is substantially confined to the first evaporator section for evaporation, and means to supply air for cooling said condenser sections in parallel.

10. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the first condenser section is substantially confined to the first evaporator section for evaporation, and means for cooling said first condenser section to at least as low a temperature as said second condenser section.

11. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, means to supply vaporous refrigerant to said first condenser section, said second condenser section being connected to receive vaporous refrigerant when the first condenser section is inadequate to condense refrigerant, said first and second evaporator sections being so connected in the system that liquid refrigerant flowing from the first condenser section is confined to the first evaporator section for evaporation, and means to maintain said first evaporator section at constant temperature.

12. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the first condenser section is substantially confined to the first evaporator section for evaporation, means to maintain said first evaporator section at constant temperature, and means to cool said first condenser section to at least as low a temperature as said second condenser section.

13. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, and means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the second condenser section may evaporate in the second evaporator section and the first evaporator section while refrigerant flowing from the first condenser section may evaporate in the first evaporator section and may not evaporate in the second evaporator section.

14. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the second condenser section may evaporate in the second evaporator section and the first evaporator section while refrigerant flowing from the first condenser section may evaporate in the first evaporator section and may not evaporate in the second evaporator section and means to drain said first evaporator section to a place in said system remote from said second evaporator section.

15. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the second condenser section into the second evaporator section may flow therefrom into the first evaporator section, and means to drain the first evaporator section to a point in the system remote from the second evaporator section.

16. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the second condenser section may evaporate in the second evaporator section and the first evaporator section while refrigerant flowing from the first condenser section may evaporate in the first evaporator section and may not evaporate in the second evaporator section, and means to supply cooling air to said condenser sections in parallel.

17. In a refrigerator having a storage compartment, a refrigerating system having an evaporator including a first section having a relatively small surface for heat transfer with air in said compartment and a second section having a relatively large surface for heat transfer with air in said compartment, a first condenser section, means to conduct liquid refrigerant from said first condenser section to said first evaporator section, a second condenser section, means to conduct liquid refrigerant from said second condenser section to said second evaporator section, and means to supply vaporous refrigerant to said first condenser section, said second condenser section being connected to receive vaporous refrigerant when the first condenser section is inadequate to condense refrigerant, said first and second evaporator sections being so connected in the system that refrigerant flowing from the second condenser section may evaporate in the second evaporator section and the first evaporator section while refrigerant flowing from the first condenser section may evaporate in the first evaporator section and may not evaporate in the second evaporator section, both said condenser sections being directly responsive to variations in atmospheric temperature.

18. In a refrigerating system including a first evaporator section having a relatively small heat transfer surface, a second evaporator section having a relatively large heat transfer surface and first and second condenser members connected to supply liquid refrigerant in parallel to the first and second evaporator sections respectively, the improvement which consists in supplying vaporous refrigerant directly to the first condenser member and from the first condenser member to the second condenser member, and subjecting each of the condenser members directly to variations of atmospheric temperature, whereby the second evaporator section and second condenser member supplement the first evaporator section and first condenser member in response to increase of atmospheric temperature.

19. In a refrigerating system including a first evaporator section having a relatively small heat transfer surface, a second evaporator section having a relatively large heat transfer surface and first and second condenser members connected to supply liquid refrigerant in parallel to the first and second evaporator sections respectively, the improvement which consists in supplying vaporous refrigerant directly to the first condenser member and from the first condenser member to the second condenser member, subjecting each of the condenser members directly to variations of atmospheric temperature, whereby the second evaporator section and second condenser member supplement the first evaporator section and first condenser member in response to increase of atmospheric temperature, and maintaining the first evaporator member at constant temperature.

20. In a refrigerating system including a first evaporator section having a relatively small heat transfer surface, a second evaporator section having a relatively large heat transfer surface and first and second condenser members connected to supply liquid refrigerant in parallel to the first and second evaporator sections respectively, the improvement which consists in supplying vaporous refrigerant directly to the first condenser member and from the first condenser member to the second condenser member, flowing liquid refrigerant from the second evaporator section to the first evaporator section, while preventing flow of liquid refrigerant from the first evaporator section to the second evaporator section, and subjecting the condenser members directly to variations of atmospheric temperature, whereby the second evaporator section and second condenser member supplement the first evaporator section and first condenser member in response to increase of atmospheric temperature.

21. In a refrigerator having a food storage compartment, refrigeration apparatus including a plurality of cooling elements located in said compartment, a first of said cooling elements being adapted to receive ice freezing trays and having limited surface for heat transfer from air in said compartment and a second of said cooling elements having relatively extensive surface for heat transfer from air in said compartment, means for supplying refrigerant fluid to said first cooling element in a manner to maintain the latter at a substantially constant temperature below the freezing temperature of water, and means for supplying liquid refrigerant to said second cooling element only upon increase of temperature at the outside of said compartment causing such increase in heat leakage into said compartment that the surface of said first cooling element is inadequate to maintain a desired ratio between said constant temperature of said first cooling element and the temperature of the air in said compartment.

22. In a refrigerator having a storage compartment, a plurality of cooling elements in said compartment, means for supplying liquid refrigerant to a first of said cooling elements in a manner to maintain the latter at a substantially constant temperature, and means for supplying liquid refrigerant to a second of said cooling elements only upon increase of temperature at the outside of said compartment causing such increase in heat leakage into said compartment that the surface of said first cooling element presented for heat transfer from air in said compartment is inadequate to maintain a desired ratio between the temperature of said first cooling element and the temperature of the air in said compartment.

23. A method of cooling air in a compartment which includes evaporating liquid at a substantially constant temperature in limited heat transfer relation with the air, and evaporating liquid in relatively extensive heat transfer relation with the air only upon increase of temperature at the outside of said compartment causing such increase in heat leakage into said compartment that said limited heat transfer relation is inadequate to maintain a desired ratio between the liquid evaporating at said constant temperature and the temperature of the air in said compartment.

24. In a refrigerator having a food storage compartment, absorption refrigeration apparatus including a plurality of evaporation members one above the other in said compartment, an absorber interconnected with a lower member for circulation of inert auxiliary gas therebetween, a condenser having connections for delivery of liquid refrigerant from a first part of the condenser to said lower evaporation member and from a further portion of the condenser to an upper evaporation member, said evaporation members being located in the upper part of said food storage compartment so that air therein is cooled by natural flow downwardly over first said upper evaporation member and then said lower evaporation member, and means for conducting inert gas from said lower evaporation member to said absorber in a path of flow including said upper evaporation member, whereby said upper evaporation member operates at a temperature higher than that of said lower evaporation member, and air in said compartment is cooled in two stages except at low condenser temperatures when liquid flows only from the first part of said condenser to said lower evaporation member, said upper evaporation member having relatively extensive heat transfer surface for adequate cooling of the air when the condenser temperature is high enough so that liquid flows from the further part of the condenser to the upper evaporation member.

25. In a refrigerator having a thermally insulated compartment, absorption refrigeration apparatus including a plurality of evaporation members one above the other in said compartment so that air in said compartment is cooled by natural flow downwardly over first an upper evaporation member and then a lower evaporation member, an absorber interconnected with said lower evaporation member for circulation of inert auxiliary gas therebetween, a condenser having connections for delivery of liquid to both said evaporation members, and means for conducting inert gas from said lower evaporation member to said absorber in a path of flow including said upper evaporation member, whereby said upper evaporation member operates at a temperature higher than that of said lower member and air in said compartment is cooled in two stages.

26. In a refrigerator having a thermally insulated storage compartment, refrigeration apparatus including a cooling element in said compartment having relatively limited surface for heat transfer from air in said compartment, a second cooling element having relatively extensive surface for heat transfer from air in said compartment, means for supplying refrigerant fluid to said first cooling element in a manner to maintain the latter at a substantially constant temperature below the freezing point of water, and means for supplying liquid refrigerant to said second cooling element only when the surface of said first cooling element is inadequate to maintain a desired temperature of the air in said compartment, said second cooling element being located above said first cooling element so that air in said compartment flowing downwardly over said elements is cooled in two stages when said second cooling element is in operation.

ALBERT R. THOMAS.